(12) United States Patent
Berns, Jr. et al.

(10) Patent No.: US 7,694,611 B2
(45) Date of Patent: Apr. 13, 2010

(54) TURRET-MOUNTED WORKPIECE EJECTOR

(75) Inventors: Joseph Frank Berns, Jr., Cincinnati, OH (US); Gary Wildt, Erlanger, KY (US)

(73) Assignee: J.F. Berns Co., Inc., Cincinnati, OH (US)

(*) Notice: Subject to any disclaimer, the term of this patent is extended or adjusted under 35 U.S.C. 154(b) by 755 days.

(21) Appl. No.: 11/625,075

(22) Filed: Jan. 19, 2007

(65) Prior Publication Data

US 2008/0173146 A1 Jul. 24, 2008

(51) Int. Cl.
*B23Q 7/00* (2006.01)
*B23B 9/00* (2006.01)

(52) U.S. Cl. .......................... 82/124; 82/152

(58) Field of Classification Search ............ 82/117, 82/124, 152, 158, 159
See application file for complete search history.

(56) References Cited

U.S. PATENT DOCUMENTS

| | | | |
|---|---|---|---|
| 1,446,305 A | 2/1923 | Howe | |
| 2,236,047 A | 3/1941 | Wattleworth | |
| 2,248,393 A | 7/1941 | Schwarz | |
| 2,577,442 A | 12/1951 | Adams et al. | |
| 3,104,885 A | 9/1963 | Dunham | |
| 3,353,688 A * | 11/1967 | Kuckelsberg et al. | 414/16 |
| 3,469,295 A * | 9/1969 | De Gain | 29/57 |
| 3,683,724 A | 8/1972 | Crane | |
| 3,812,983 A | 5/1974 | Wanner et al. | |
| 3,927,583 A | 12/1975 | Parsons et al. | |
| 3,937,331 A | 2/1976 | Spercel | |
| 4,012,830 A * | 3/1977 | Ewertowski | 483/46 |
| 4,958,543 A | 9/1990 | Newton et al. | |
| 5,031,490 A * | 7/1991 | Grossmann | 82/124 |
| 5,505,584 A | 4/1996 | Berns | |
| 5,715,735 A * | 2/1998 | Alden et al. | 82/124 |
| 5,806,859 A | 9/1998 | Saccomanno, III | |
| 6,189,424 B1 | 2/2001 | Wheeling et al. | |
| 6,883,407 B2 | 4/2005 | Smith et al. | |
| 6,883,745 B2 | 4/2005 | Trutschel | |

* cited by examiner

*Primary Examiner*—Will Fridie, Jr.
(74) *Attorney, Agent, or Firm*—Wood, Herron & Evans, LLP (57) ABSTRACT

A workpiece ejector and a method for ejecting workpieces from a turning machine such as a lathe. The turning machine has at least one spindle for receiving workpieces therethrough and at least one chuck associated with the spindle for holding a workpiece during machining operations. In one embodiment, the ejector includes a piston mounted at a location outside the spindle and proximate the chuck, the piston having a first end adapted to engage the workpiece and being movable between a first position where the first end is located outside the spindle and a second position where the first end and at least a portion of the piston are within the spindle. An actuator is operative to move the piston from the first position toward the second position. The actuator may include a mechanical spring.

15 Claims, 9 Drawing Sheets

TURRET-MOUNTED WORKPIECE EJECTOR

TECHNICAL FIELD

The present invention generally relates to turning machines, such as lathes. More specifically, the invention relates to devices for automatically ejecting workpieces from turning machines.

BACKGROUND

Various types of feed mechanisms exist in the machine tool industry to automate the loading and/or unloading of workpieces into and out of a turning machine. Turning machines such as conventional hollow-spindle lathes may include a motor-driven rotating spindle which has a collet chuck mechanism connected to one end thereof for gripping material to be machined. In initial workpiece machining, which may be termed primary machining operations, workpieces may be machined from raw bar stock that extends from within the spindle and is gripped by the collet mechanism. After the primary machining is completed, the machined workpiece may be cut from the bar stock. Thereafter, the collet mechanism may be opened and additional bar stock may be fed through the spindle so that a new portion of the stock material may be received in the collet chuck mechanism for machining. This cycle is repeated to form several machined workpieces from the bar stock supplied through the spindle.

In many instances, secondary machining operations may be performed on workpieces that have previously been machined using the primary machining operation described above. These secondary operations are required, for example, when a different tool is needed to perform additional machining. In such cases, the previously-machined workpieces may be individually placed in the collet mechanism for further machining. In these secondary machining operations, the machined workpiece is held by the collet mechanism. Once the desired machining is completed on the workpiece, the machined workpiece must be ejected from the collet mechanism.

In other applications, multi-spindle lathes may be used to manufacture a machined part. Primary machining operations may be performed on bar stock material extending from a first spindle, whereafter the workpiece may be transferred to a second spindle for secondary machining operations. Generally, bar stock material will not be located in the second spindle, and finished workpieces may therefore be ejected through the second spindle.

Various workpiece ejectors have been proposed for use in turning machines, such as conventional lathes used in secondary operations. Conventional workpiece ejectors may generally include an elongated ejector push rod that extends through the spindle of an otherwise conventional lathe. The ejector push rod may be attached to an external plate that is driven by fixed, external air actuators to move the push rod into engagement with a workpiece and thereby eject the workpiece from the collet mechanism. As a result of the inclusion of external actuators, the space required for installation of a lathe including such an ejector may be substantially greater. In addition, conventional ejectors of this type may be costly and complex.

Other workpiece ejectors, such as the type disclosed in U.S. Pat. No. 5,715,735, are located inside the spindle, occupying some of the space which would otherwise be available for workpieces, and thereby limiting the size of the workpiece that can be machined. An additional drawback of this type of spindle-contained ejector is that it may deposit the finished workpiece in an area generally in front of the chuck, on one of the lathe surfaces, such as a chip pan or the lathe bed. Once this limited area fills up, manual intervention may be required in order for the accumulated finished workpieces to be removed.

Still other workpiece ejectors may be designed such that the ejecting mechanism, such as a spring or a pneumatically actuated piston or drive rod, will be restrained by the closed chuck holding the workpiece. When the chuck begins to open, and before if has fully released the workpiece, the spring or pneumatic device will begin the ejection, thereby potentially damaging the surfaces of the workpiece, due to contact with the chuck jaws during ejection. Such movement of the workpiece before the chuck has fully released the workpiece may not be suitable when a fine surface finish is desired.

Improvements to unloading devices for turning machines are therefore desirable.

SUMMARY

A workpiece ejector for turning machines having at least one spindle for receiving workpieces therethrough and at least one chuck associated with the spindle for holding a workpiece during machining operations may include a piston having a first end adapted to engage the workpiece and having a first position and a second position. The piston may be adapted to be mounted outside the spindle and proximate the chuck such that the first end is located outside the spindle in the first position and the first end is located within the spindle in the second position. The ejector may include an actuator operative to move the piston from the first position toward said second position when triggered by contact between a release mechanism and the chuck.

In another embodiment, a combination of a workpiece ejector and a turning machine may include a spindle for receiving workpieces therethrough, a chuck associated with the spindle and adapted to hold a workpiece, and a piston adapted to be mounted to the turning machine outside the spindle and proximate the chuck. The piston may have a first end adapted to engage a workpiece and may be moved between a first position where the first end is outside the spindle and a second position where the first end is within the spindle. The apparatus may further include an actuator operative to move the piston from the first position toward the second position when triggered by contact between a release mechanism and the chuck. The release mechanism may engage the piston and maintain it in the first position against the bias of a spring until selectively actuated to release the piston for movement toward the second position.

In yet another embodiment, a method of ejecting a workpiece from a turning machine having at least one spindle for receiving material therethrough and at least one chuck associated with the spindle for holding a workpiece during machining operations may include releasing the workpiece from the chuck, moving a piston mounted at a location outside the spindle and proximate the chuck from a first position outside the spindle to engage the workpiece, and rapidly extending the piston to a second position within the spindle such that the workpiece travels through the spindle and is ejected therefrom.

BRIEF DESCRIPTION OF THE DRAWINGS

The above-mentioned features, as well as other features and advantages of this invention, and the manner of attaining them, will become more apparent and the invention itself will be better understood by reference to the following description of illustrative embodiments of the invention taken in conjunction with the accompanying drawings, wherein.

DETAILED DESCRIPTION

Figure 1:
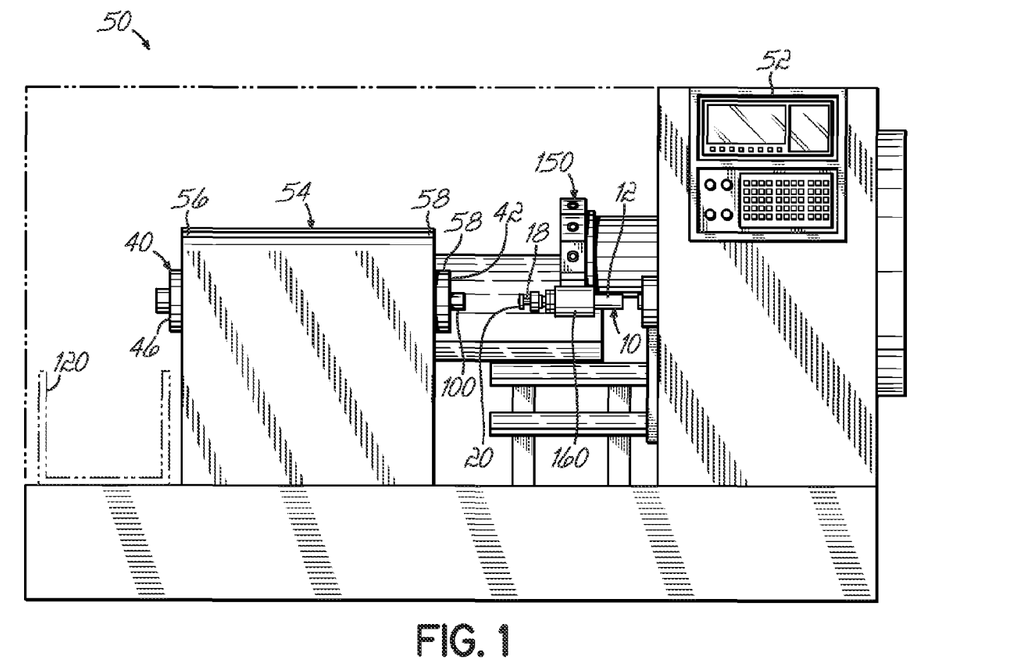
FIG. 1 is a side view of a lathe including an exemplary workpiece ejector.

FIG. 1 depicts a turning machine in the form of a conventional CNC lathe 50 including an exemplary workpiece ejector 10. Lathe 50 includes a headstock assembly 54 with front and back ends 58, 56, a spindle 40, a chuck 44, and a tool turret 150 mounted to a main slide for movement of the turret 150 in directions toward and away from the chuck 44, as known in the art. Bar stock is fed through the back of spindle 40 to be received in the chuck 44 on an opposite side of headstock assembly 54. The turret 150 includes a plurality of tool stations, each configured to receive a workpiece cutting and finishing tool. Turret 150 may be rotated and advanced along the main slide to engage a tool with the end of the bar stock or a workpiece 100 mounted in chuck 44. Lathe 50 may further include a computer 52 for controlling operation of the lathe 50, as known in the art.

In the embodiment shown, an exemplary workpiece ejector 10 is mounted to a tool station on the turret 150, with a longitudinal axis thereof aligned with the longitudinal axis of the spindle 40. The workpiece ejector 10 is mounted on the turret 150 via a mounting block 160 surrounding a housing 12 of the workpiece ejector 10, the details of which will be described further below. While the workpiece ejector 10 is shown and described as being mounted to the turret 150 using mounting block 160, it will be appreciated that workpiece ejector 10 may alternatively be mounted to other portions of the lathe 50, and by structure other than the mounting block 160. The ejector is positioned with a disk 20 of a piston 18 generally facing the first end 42 of the spindle 40, chuck 44 and front end 58 of the headstock assembly 54.

Figure 2:
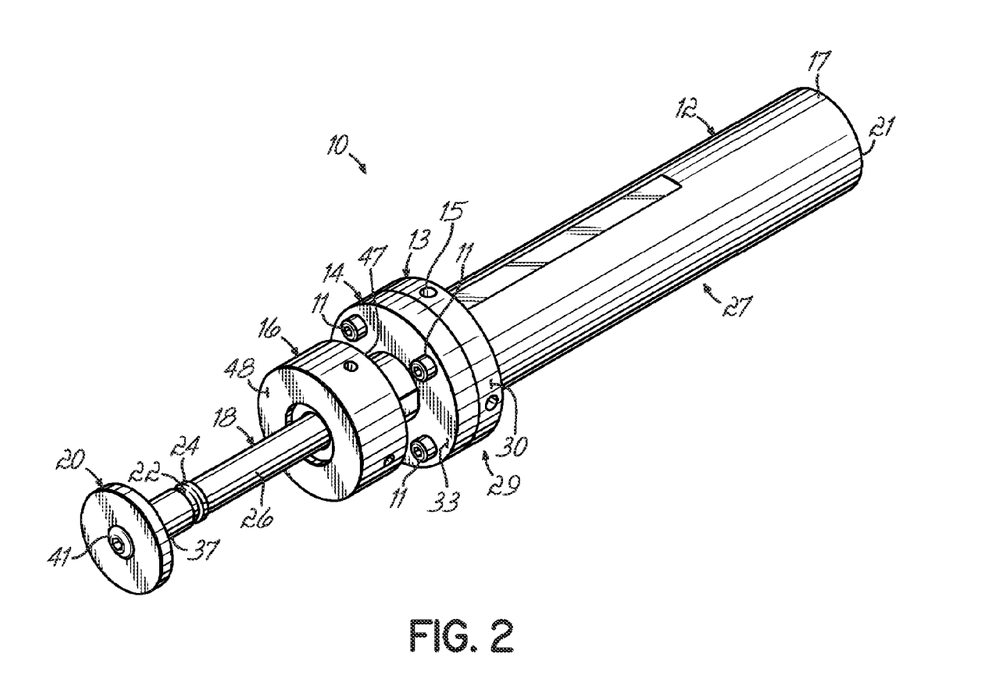
FIG. 2 is a perspective view of the workpiece ejector shown in FIG. 1.
Figure 3:
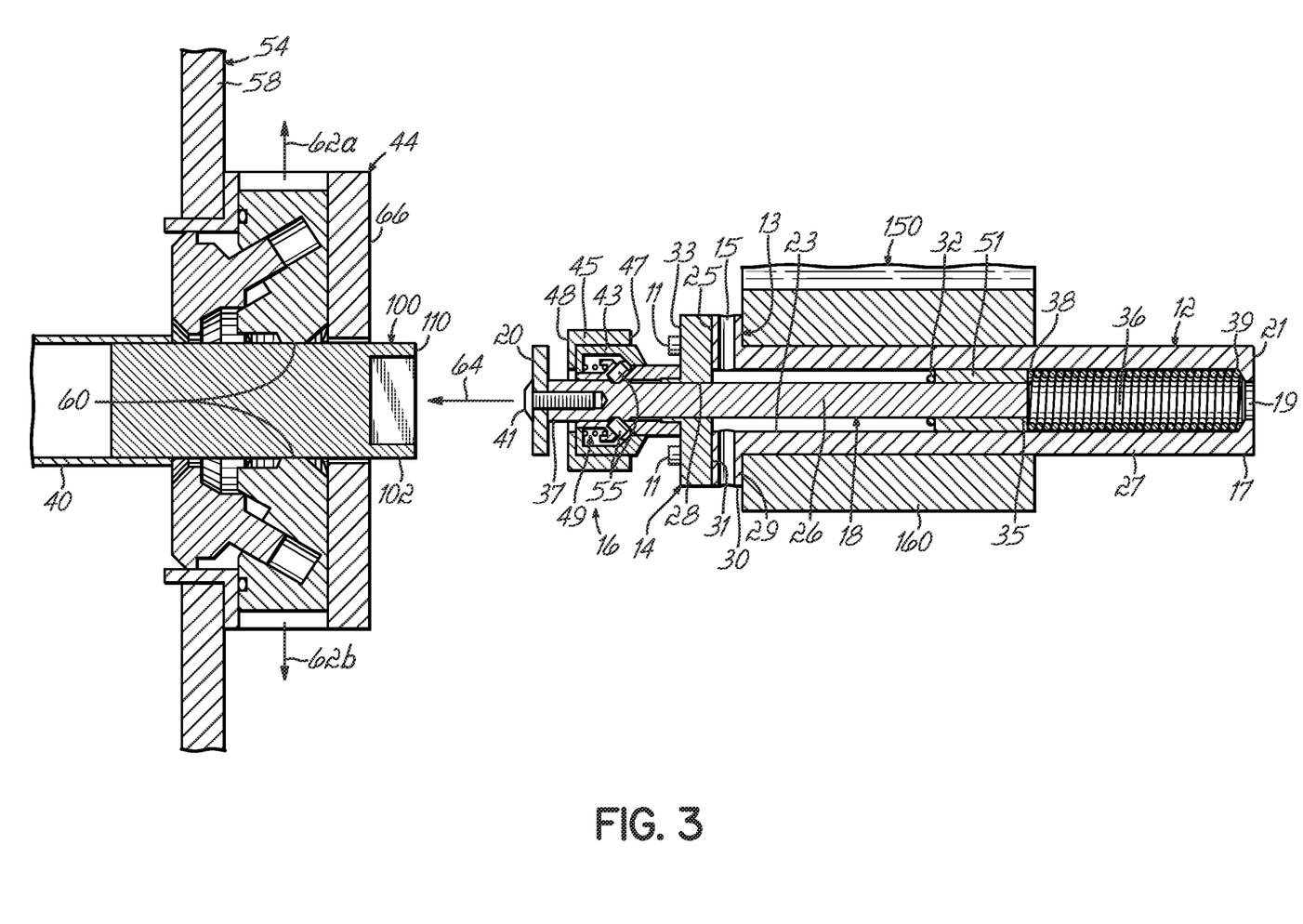
FIG. 3 is a cross-sectional elevation view of the lathe chuck, the workpiece held by the chuck and the workpiece ejector of FIGS. 1-2 prior to starting the ejection process.

With reference to FIGS. 2 and 3, the workpiece ejector 10 of FIG. 1 is generally a uniaxial device with components generally concentric to each other. The ejector includes a tubular cylindrical housing 12 containing a compression spring 36, a disk-shaped coupling adapter 14, a latch and release mechanism 16, a piston rod 26, and a workpiece engaging disk 20. A groove 22 and a radial protrusion 24 adjacent the groove 22 define portions of the surface of the piston rod 26. The groove 22 and radial protrusion 24 are shaped to work in conjunction with the latch and release mechanism 16 to hold the piston 18 in a first position associated with the compressed condition of the spring in the housing 12.

With continued reference to FIGS. 2 and 3, the workpiece ejector housing 12 has a generally closed first end 17 containing an air vent aperture 19 through a first end face 21, for air pressure relief. The housing 12 comprises a first portion 27 of generally constant diameter that starts at its first end face 21 and a flange 13. Housing 12 includes a bore 23, extending through its axial center, to allow passage of piston rod 26, and first and second end faces 21, 25. Air passages 15 extend generally radially outwardly from bore 23 of the housing 12 to the circumferential surface 30 of flange 13. These passages 15 allow air to pass between the central bore 23 and the exterior of the housing 12 as piston rod 26 reciprocates within bore 23.

With continued reference to FIGS. 2-3, a coupling adapter 14 is coupled to the housing 12 by conventional fasteners, such as bolts 11. Coupling adapter 14 generally has an outer diameter identical to that of flange 13 of the housing 12, has a bore 28 sized to allow passage of the piston rod 26, and provides a mounting surface for latch and release mechanism 16, thereby coupling latch and release mechanism 16 to housing 12. The adapter 14 has first and second flat, parallel, end faces 31, 33. The first face 31 abuts the second end face 25 of the housing 12 and, as indicated above, is affixed to housing 12 by conventional bolts 11. Even though the adapter 14 in this embodiment is of a diameter substantially equal to that of flange 13 of housing 12, persons skilled in the art will appreciate that other relative dimensions may alternatively be suitable for adapter 14. During operation, adapter 14 limits the travel of the compression spring 36 when actuated.

FIG. 3 shows an o-ring 32 made of a resilient, high-impact material such as a rubber-based composite, located in the central bore 23 of the housing 12, and positioned between the sleeve 51 and the first face 31 of the coupling adapter 14. The o-ring 32 acts as a bump stop, preventing direct contact between the piston 18 and the adapter 14, thereby minimizing the probability of impact damage from contact between the sleeve 51 or spring 36 and the coupling adapter 14. While an o-ring is shown and described, other suitable elements may be substituted for the o-ring 32 to prevent damage to the piston 18, sleeve 51, spring 36 and adapter 14.

FIG. 3 shows a compression spring 36 in the central bore 23 of the housing 12. The outer diameter of the spring 36 is sized to fit closely within the inner diameter of the bore 23 of the housing 12, to prevent buckling of the spring 36 during compression and lateral travel during extension thereof.

FIGS. 2-3 also show a piston 18 having a generally cylindrical piston rod 26 with first and second ends 35, 37. The first end 35 of the rod 26 is adjacent a first end 38 of the spring 36 and may or may not be affixed thereto. Affixation may be accomplished by any suitable method or structure, such as adhesive, mechanical bonding, welding, magnetic coupling devices or any combination thereof. Piston rod 26 may alternatively be integrally formed with the spring 36. Ejector 10 further includes a sleeve 51 operatively coupled to the piston rod 26, adjacent the first end 35, for contacting the spring 36 and maintaining the piston rod 26 centered within bore 23 as piston 18 reciprocates in bore 23.

The second end 39 of the spring 36 is adjacent the interior of the first end 17 of the housing 12 and may or may not be affixed thereto. Affixation may be accomplished by any suitable method or structure, such as those recited above for attachment of the first end 38 of the spring 36 to the piston rod 26. Alternatively, the second end 39 of the spring 36 may be left unaffixed to the housing 12.

With continued reference to FIGS. 2-3, the second end 37 of the piston rod 26 is coupled to a metal disk 20 by any suitable method, such as by a conventional screw 41 extending through the center of the disk 20 and rod 26. Other alternatives such as integrally forming the disk 20 to rod 26 or other methods or structure for interconnecting these two elements may be substituted. Such methods may include, for example, those involving mechanical bonding, adhesives, welding or the use of a different type and/or number of fasteners suitable to hold the rod 26 and disk 20 together.

Ejector 10 includes a generally tubular latch and release mechanism 16 slidably disposed over the piston rod 26, and adjacent the second face 33 of the coupling adapter 14. The release mechanism 16 includes concentric first and second collars 43, 45 slidably disposed over the piston rod 26. Second collar 45 is slidably and partially mounted over the first collar 43 and has a first end 47 generally facing the coupling adapter 14 and a second, opposite end 48. Latch and release mechanism further 16 includes a conventional, spring-biased, quick-release mechanism having a spring 49 that urges first collar 43 in a direction toward disk 20 so that roller bearings 55 are retained in a position that engages groove 22 and the annular protrusion 24 on piston rod 26 to thereby lock the piston rod 26 in the first, retracted position. As first collar 43 is moved in a direction away from disk 20, the bearings 55 are released for movement to disengage from groove 22 and protrusion 24 to thereby permit piston rod 26, biased by spring 36, to move rapidly toward the second, extended position (see FIG. 7).

While the latch and release mechanism 16 has been described in detail as including concentric collars and a quick-release mechanism, persons skilled in the art will appreciate the fact that various other types of latch and release mechanisms can be alternatively adapted to work in conjunction with the workpiece ejector 10. For example, a hydraulically operated mechanism may be provided and may be configured to utilize the high pressure cooling fluid supplied to the turret 150 to selectively latch and release the piston rod 26 under the control of computer 52. Alternatively, a pneumatically operated mechanism may be provided, or various other mechanisms may be used to selectively latch and release the piston rod 26. These other types of latch and release devices may be useful when the configuration of a workpiece does not facilitate engaging latch and release mechanism 16 with chuck 44, as described below.

FIGS. 3-9 show a workpiece 10 and a conventional collet chuck 44 for holding a workpiece 100 during operation of a turning machine, such as a lathe. When the chuck 44 is open, the workpiece 100 is released to be moved or removed. Upon completion of processing of the workpiece 100 being held by the chuck 44, the chuck 44 is opened as indicated by the vertical arrows 62a, 62b (FIG. 3) to allow free movement of the workpiece 100 within, into or out of the lathe spindle 40. The turret 150 on which the workpiece ejector 10 is mounted is rotated and oriented such that the longitudinal axis of ejector 10 is substantially aligned with the axis of the spindle 40. The turret 150 may also be translationally moved in the direction of the spindle 40 and workpiece 100, as indicated by the horizontal arrow 64 (FIG. 3).

Figure 4:
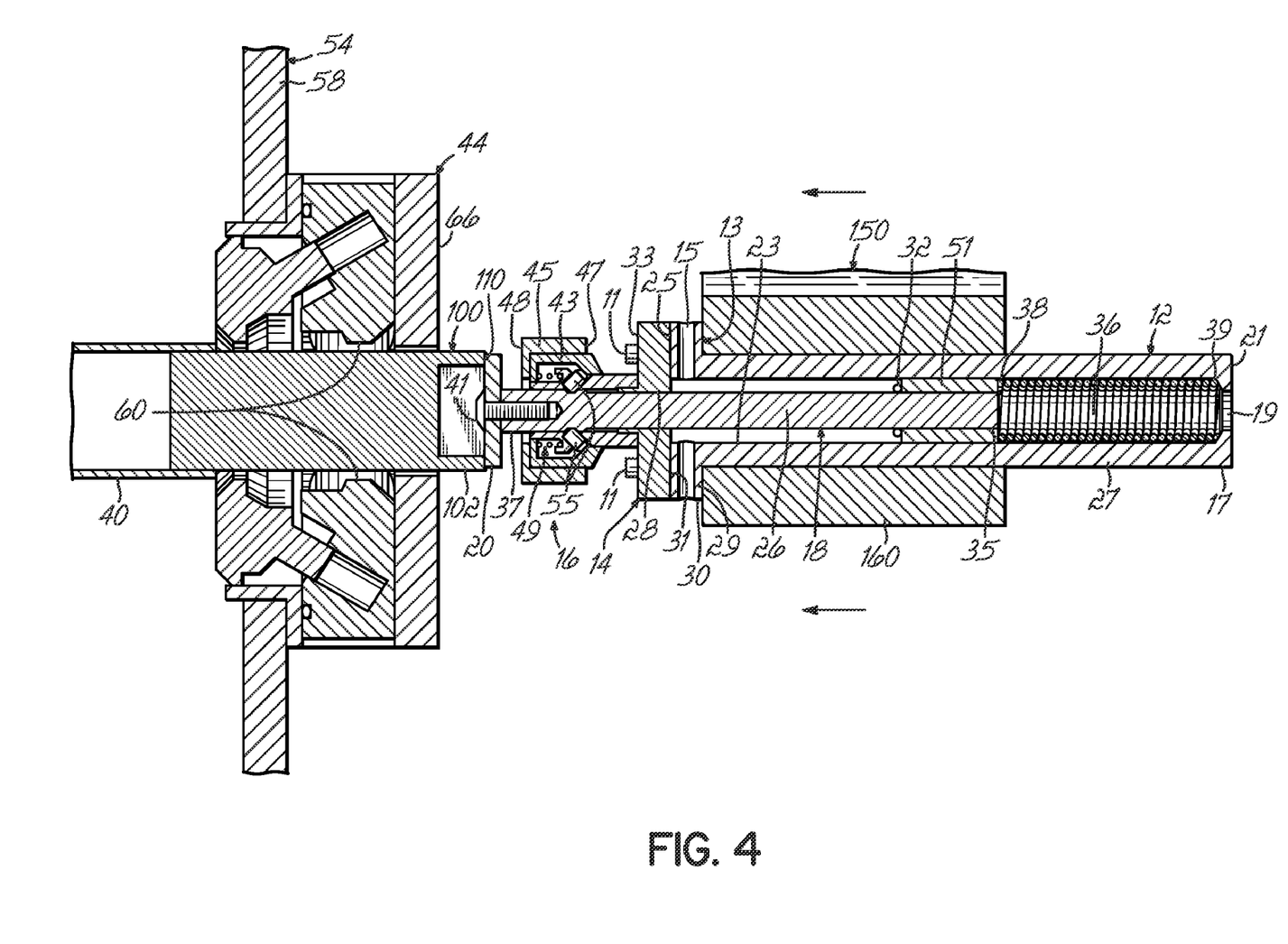
FIG. 4 is a cross-sectional elevation view, similar to FIG. 3, with the workpiece having been released by the chuck, and the workpiece ejector and turret having been moved to cause contact between the piston and the workpiece.
Figure 5:
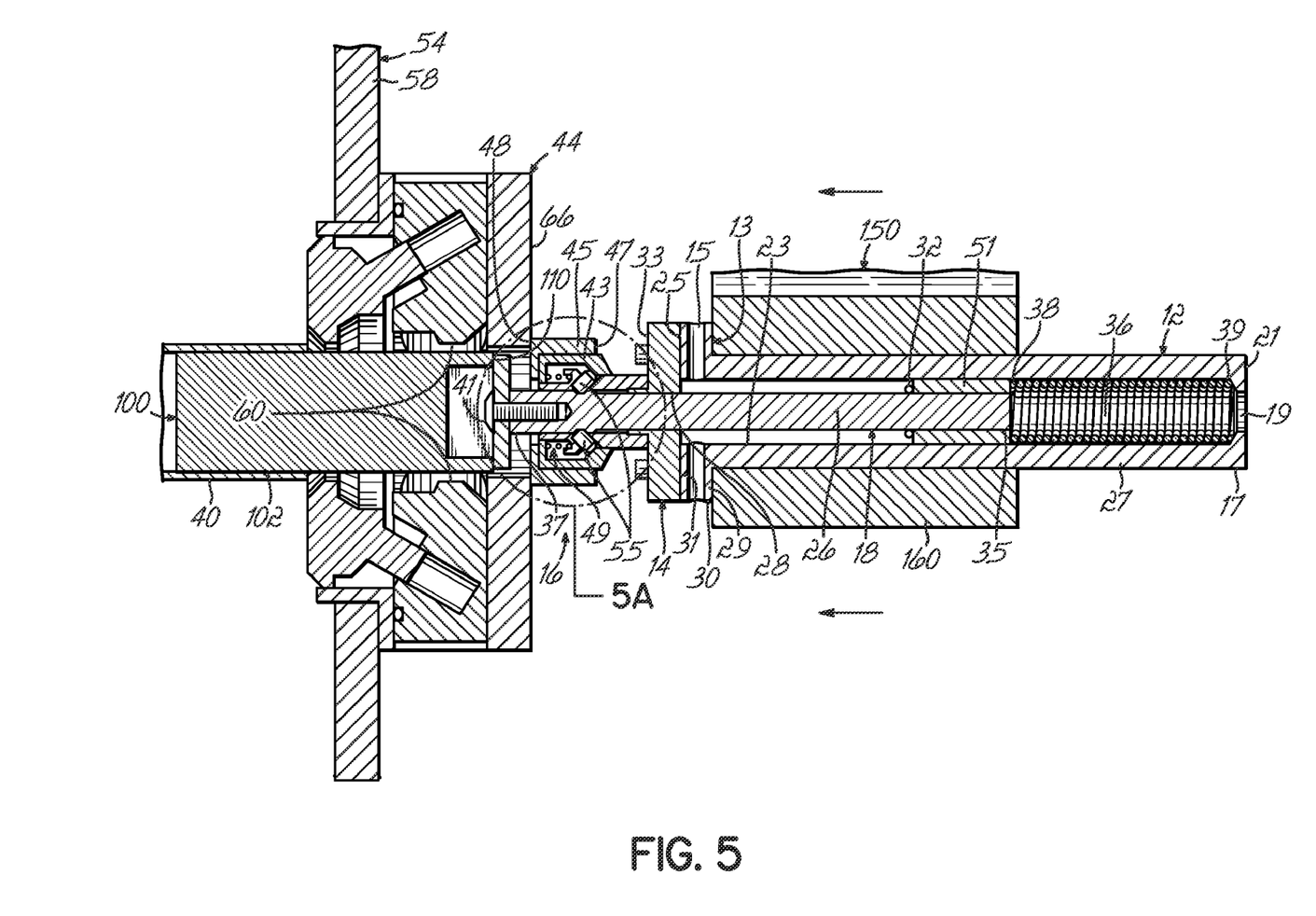
FIG. 5 is a cross-sectional elevation view, similar to FIG. 4, with a piston entering the spindle and a latch and release mechanism making contact with the chuck.
Figure 5A:
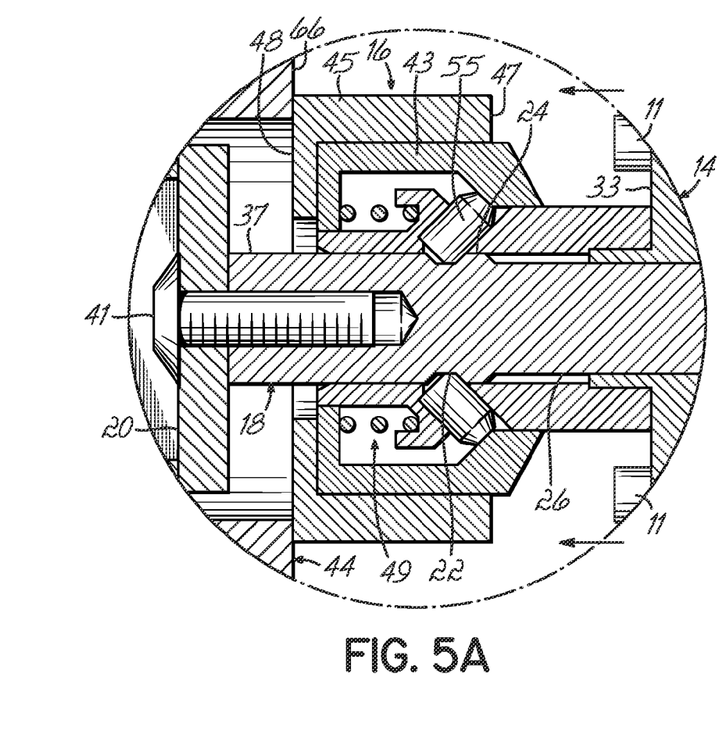
FIG. 5A is an enlarged detail view of the encircled area of FIG. 5.

As shown in FIG. 4, the translational motion of the turret 150 causes contact to occur between the piston disk 20 and the end face 110 of the workpiece 100 to push the workpiece 100 into the headstock assembly 54. The turret 150 and ejector 10 are advanced toward spindle 40 so that the second end 48 of the second collar 45 of the latch and release mechanism 16 makes contact with the outer flat surface 66 of the chuck 44, as depicted in FIGS. 5-5A. At this point, the piston 18 is partially in the spindle 40, maintaining contact with the end face 110 of the workpiece 100.

Figure 6:
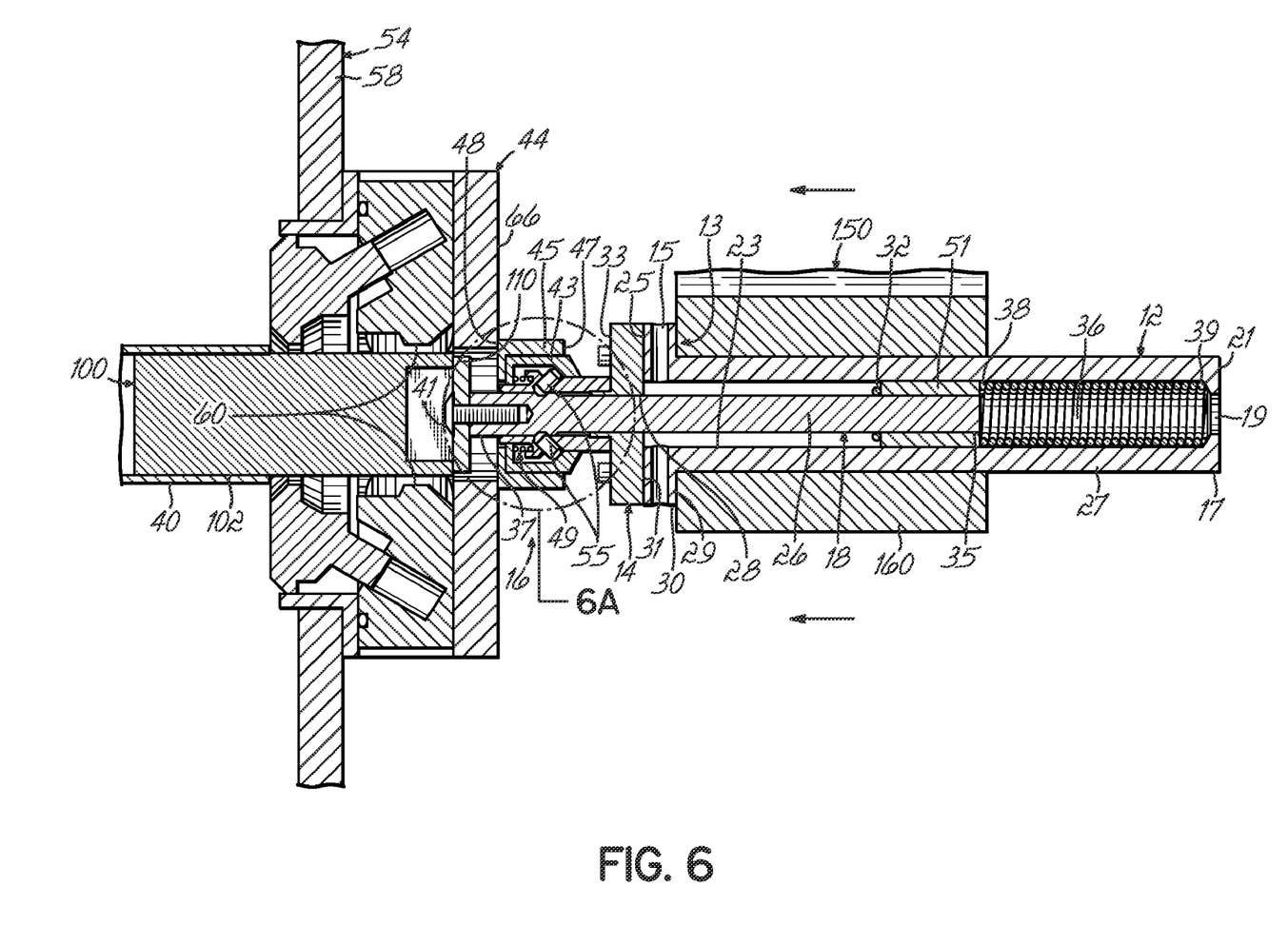
FIG. 6 is a cross-sectional elevation view, similar to FIG. 5, at the moment immediately prior to release of the workpiece ejector piston, showing the sliding motion of the latch and release mechanism.
Figure 6A:
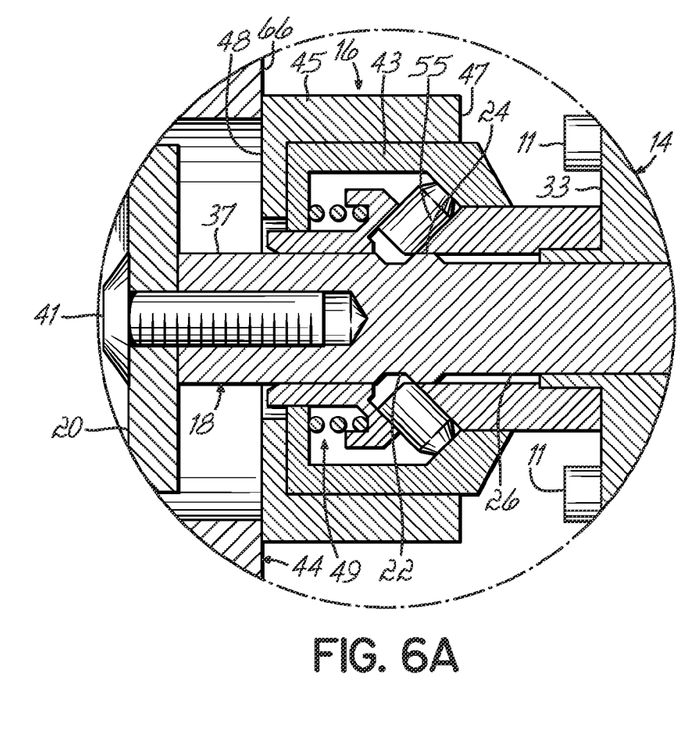
FIG. 6A is an enlarged detail view of the encircled area of FIG. 6.

With reference to FIGS. 6-6A, as turret 150 and ejector 10 continue moving toward spindle 40, the first and second collars 43, 45 of the latch and release mechanism 16 are moved in a direction to compress spring 49 and thereby cause the bearings 55 to disengage from groove 22 and protrusion 24, thereby permitting piston 18 to freely and rapidly move toward the piston's extended position by action of the force exerted by the ejector spring 36. At this point in the ejection cycle, the piston disk 20 remains in contact with the workpiece 100 inside the spindle 40.

Figure 7:
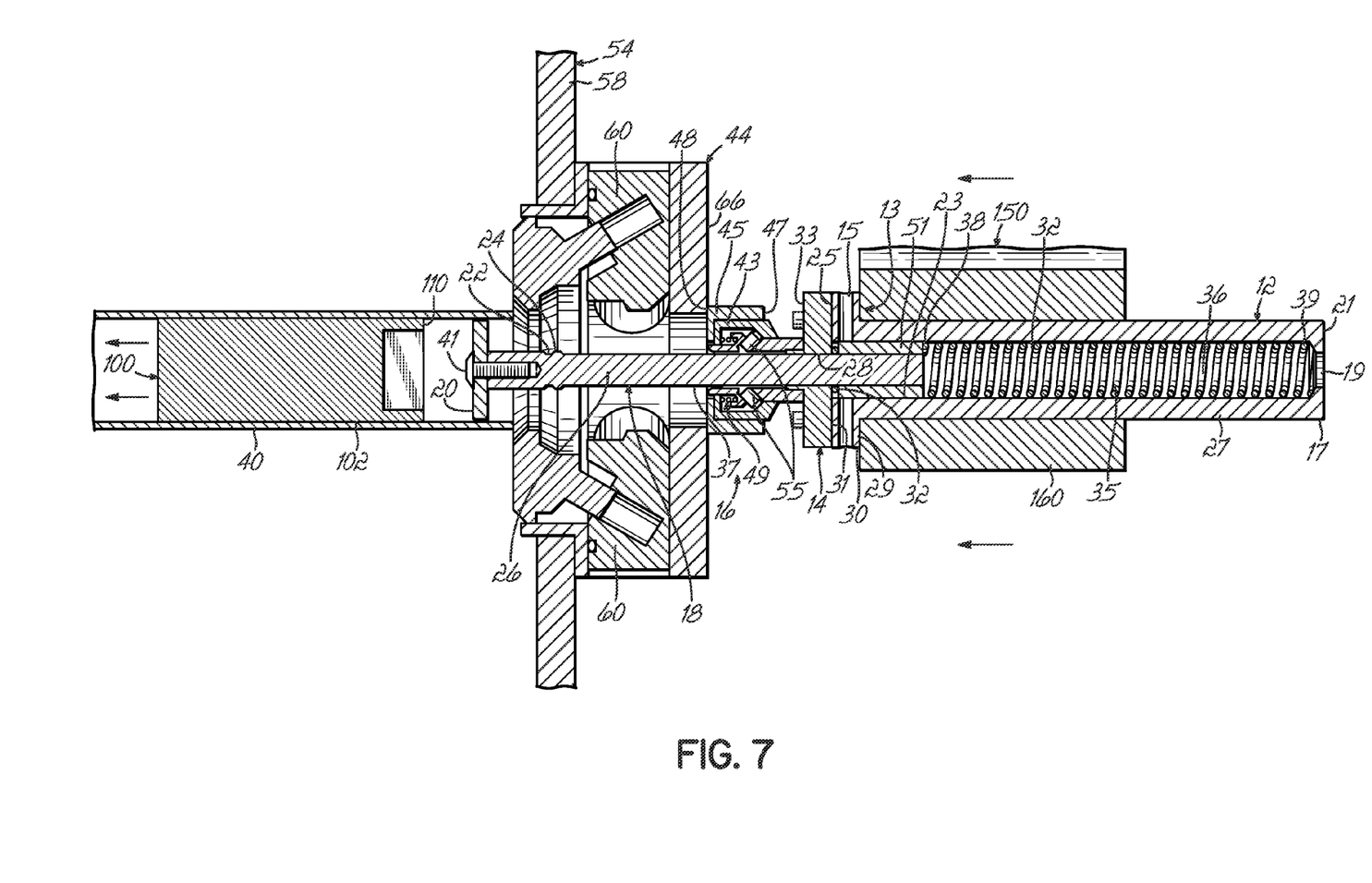
FIG. 7 is a cross-sectional elevation view, similar to FIG. 6, showing ejection of the workpiece.

With reference to FIG. 7, a point in the ejection cycle is shown whereby the bearings 55 in the latch and release mechanism 16 have been disengaged from the groove 22 of the piston rod 26, allowing the ejector spring 36 to move the piston 18 toward the extended position, consequently causing the disk 20 of the piston 18 to push the workpiece 100 through the spindle 40. In one embodiment, the ejector 10 is designed such that the force of spring 36 will be sufficient to push the workpiece 100 completely through the spindle 40 and cause it to exit the spindle 40 from the tubular protrusion 46 of the spindle 40 proximate the back end 56 of the headstock assembly 54.

Figure 8:
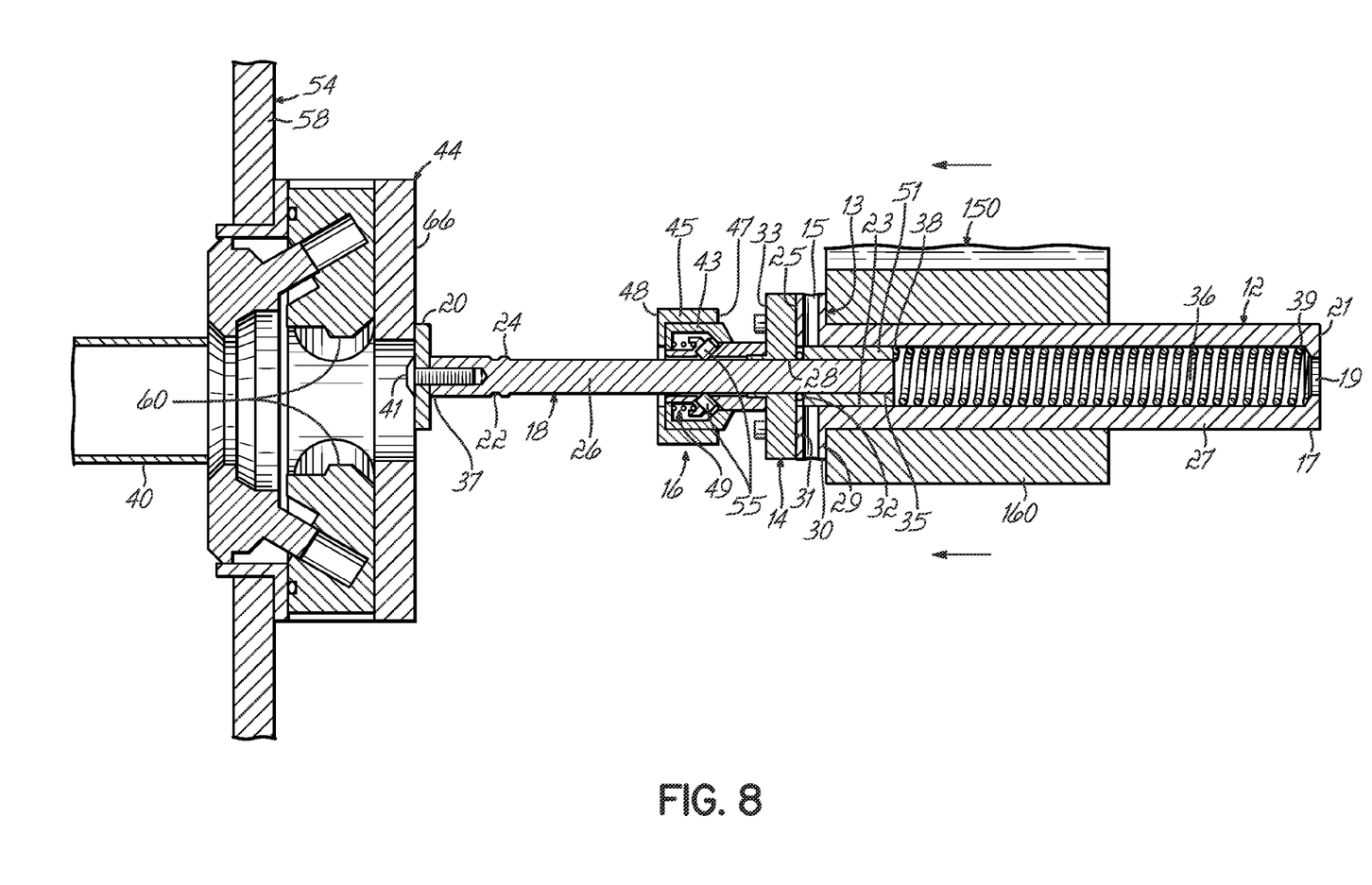
FIG. 8 is a cross-sectional elevation view, similar to FIG. 7, showing the piston in an offset position prior to resetting the rod to its locked position.

With reference to FIG. 8, the workpiece 100 is shown having been ejected from the spindle 40 and the turret 150 having been moved away from the headstock assembly 54 a distance sufficient for the piston 18 to be completely withdrawn from the spindle 40 and chuck 44. A rotatable portion of the turret 150 is then rotated to a position where the piston disk 20 can be projected to make contact with the outer surface 66 of the chuck 44. The turret 150 is then moved in the direction of the chuck 44 and headstock assembly 54, causing the chuck 44 contacting the disk 20 to push the piston 18 inwardly toward the first position, thereby compressing the spring 36.

Figure 9:
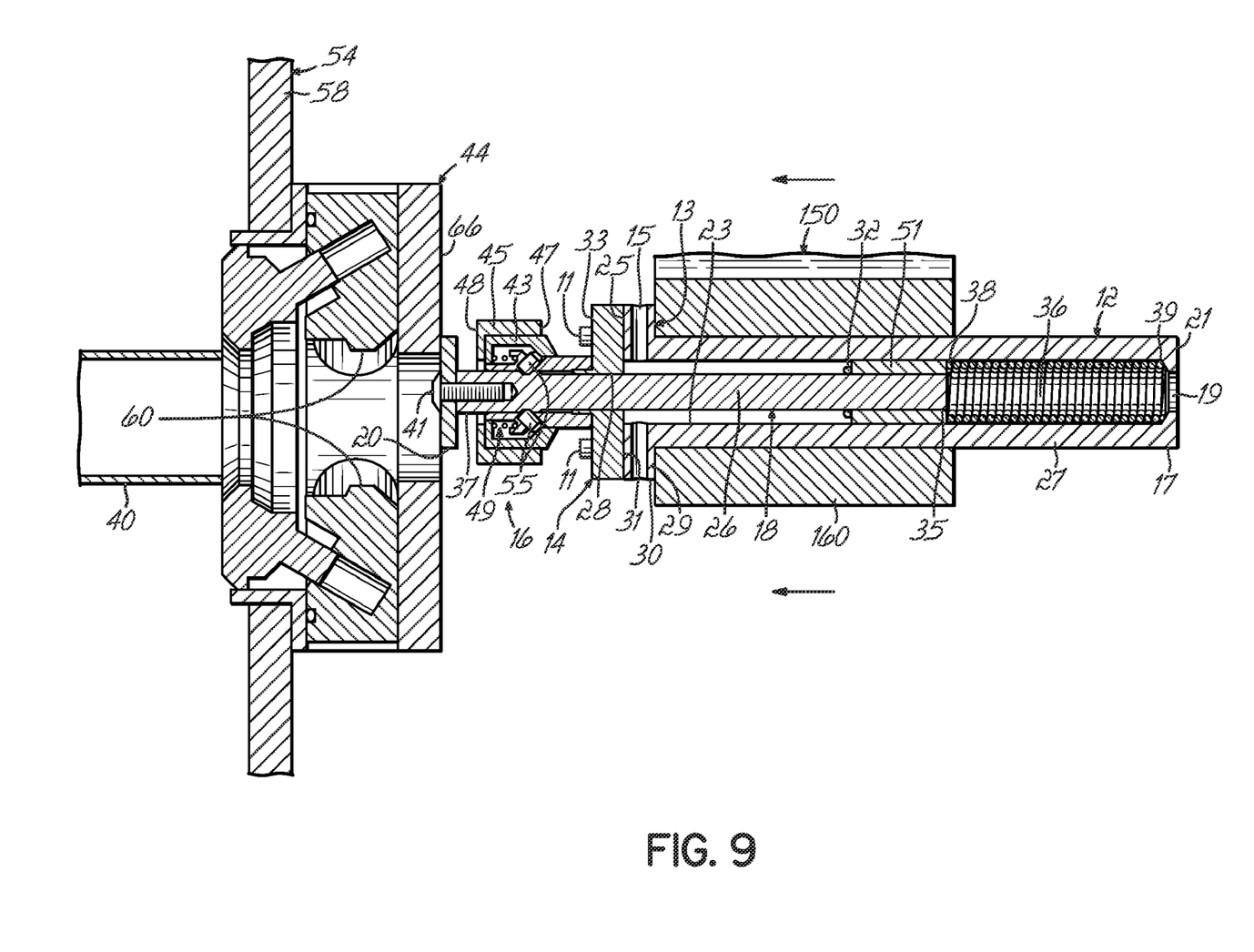
FIG. 9 is a cross-sectional elevation view, similar to FIG. 8 showing the workpiece ejector in its locked position.

With reference to FIG. 9, the piston 18 has been pushed against the chuck 44 to a point where the locking bearings 55 of the latch and release mechanism 16 have engaged the groove 22 in the piston rod 26, locking the piston 18 in a position associated with the compressed condition of the ejector spring 36. Upon reaching this locked state, the forward motion of the turret 150 is ceased and the turret 150 is translationally retracted back to its starting position away from the chuck 44. The operator may now proceed to load a new workpiece 100 into the spindle 40 of the lathe 50.

The method and apparatus described above avoids damage to the surface of the workpiece 100. This is so because the workpiece 100 is pushed and eventually ejected by the piston 18 while the chuck 44 is in its open condition. This prevents damage that may be otherwise observed with other ejection systems that use the frictional force of the chuck jaws 60 to act against the driving force of a spring, pneumatic or other actuation system actuating an ejector. In such systems, damage to a workpiece may occur because such ejectors begin to push the workpiece before the chuck jaws 60 have fully released the workpiece, thereby causing scratching of the workpiece surface.

While operation of the workpiece ejector 10 has been described above to include moving the piston rod 26 partially inside the spindle 40, engaging the release mechanism with the chuck 44, and pushing the piston rod 26 against the chuck 44 to reset the piston 18, it will be recognized that the workpiece ejector may alternatively be operated in various other ways. For example, the configuration of a workpiece 100 may be such that the piston rod 26 does not extend within the spindle 40 when the turret is moved to initially engage the workpiece, as described above. Instead, the piston rod 26 may still be located outside the spindle 40 after the piston rod has begun to push the workpiece through the spindle. In such applications, it may be desired to actuate the piston rod 26 to eject the workpiece using other mechanisms, such as hydraulic mechanisms, pneumatic mechanisms, or various other devices. It will also be recognized that the piston rod 26 need not be reset only by pushing the piston rod 26 against the chuck 44. The piston rod 26 may alternatively be reset by pushing the piston rod 26 against other structure of the lathe 50, or by using hydraulic mechanisms, pneumatic mechanism, or various other devices suitable for moving the piston rod 26 from the extending position to the retracted position.

A receptacle or bin 120 may be placed proximate the second end 46 of the spindle 40 to receive ejected workpieces. The dimensions and shape of the bin may depend on factors such as the rate of production of finished workpieces and associated storage/holding requirements. Other factors may also include, for example, the amount of available space in the area immediately proximate the second end 46 of the spindle 40, as well as the required structural rigidity of the bin 120 to withstand the weight and impact of workpieces falling into it.

While the ejector 10 shown and described herein includes a spring to rapidly move piston rod 26 toward the extended position, it will be appreciated that various other methods or components may be substituted, such as those including, for example, pneumatic, magnetic, electric, hydraulic, combustion or solid-propellant components or methods.

Yet another embodiment of the present invention may involve, for example, a tension spring rather than the compression spring 36 of the workpiece ejector 10 of FIGS. 1-9. In such case, the starting, locked position of the piston 18 would be associated with the stretched condition of the tension spring while the released position would be associated with the relaxed condition of the tension spring.

While the invention has been described with specific examples in reference to specific embodiments, persons skilled in the art will appreciate that various modifications and changes may be made to the invention as described herein without departing from the spirit and scope thereof which are defined by the appended claims.

What is claimed is:

1. A workpiece ejector for turning machines having at least one spindle for receiving workpieces therethrough and at least one chuck associated with the spindle for holding a workpiece during machining operations, the ejector comprising:
    a piston having a first end adapted to engage the workpiece and having a first position and a second position;
    said piston adapted to be mounted outside the spindle and proximate the chuck such that said first end is located outside the spindle in said first position and said first end is located within the spindle in said second position;
    a release mechanism, said release mechanism having a first condition wherein said release mechanism is operable to maintain said piston in said first position, and having a second condition wherein said release mechanism is operable to release said piston for movement toward said second position; and
    an actuator operative to move said piston from said first position toward said second position when triggered by said release mechanism.

2. The ejector of claim 1, wherein said release mechanism switches from said first condition to said second condition when said release mechanism contacts the chuck of the turning machine.

3. The ejector of claim 1, wherein said actuator comprises a mechanical spring.

4. The ejector of claim 3, wherein said mechanical spring is in a compressed state when said piston is in said first position; and
    wherein said release mechanism in said first condition constrains said mechanical spring from expanding, and said release mechanism in said second condition releases said mechanical spring for expansion to thereby move said piston toward said second position.

5. The ejector of claim 1, wherein said piston and said release mechanism are adapted to be mounted to the turning machine for movement toward the chuck, and wherein said release mechanism is configured to engage the chuck of the turning machine after said first end of said piston has engaged the workpiece held by the chuck.

6. In combination, a workpiece ejector and a turning machine, comprising:
    a spindle for receiving workpieces therethrough;
    a chuck associated with said spindle and adapted to hold a workpiece therein;
    a piston mounted to said turning machine at a location outside said spindle and proximate said chuck;
    said piston having a first end adapted to engage the workpiece;
    said piston movable between a first position wherein said first end is outside said spindle and a second position wherein said first end extends within said spindle;
    a release mechanism having a first condition wherein said release mechanism is operable to maintain said piston in said first position, and having a second condition wherein said release mechanism is operable to release said piston for movement toward said second position; and
    an actuator operative to move said piston from said first position toward said second position when triggered by said release mechanism.

7. The workpiece ejector and turning machine of claim 6, wherein said release mechanism switches from said first condition to said second condition by engagement of said release mechanism with said chuck.

8. The workpiece ejector and turning machine of claim 7, wherein said piston and said release mechanism are movable toward said chuck, and wherein said first end of said piston is positioned relative to said release mechanism to engage a workpiece in said chuck before said release mechanism engages said chuck.

9. The workpiece ejector and turning machine of claim 6, wherein said actuator comprises a mechanical spring.

10. The workpiece ejector and turning machine of claim 6, further comprising:
    a turret for supporting tools, said turret movable relative to said chuck;
    said piston being mounted to said turret for movement therewith;

wherein said turret is movable such that said piston engages and pushes the workpiece into said spindle before said piston is released for movement toward said second position.

11. A method of ejecting a workpiece from a turning machine having at least one spindle for receiving workpieces therethrough and at least one chuck associated with the spindle for holding a workpiece during machining operations, the method comprising:
   releasing the workpiece from the chuck;
   moving an ejector mounted at a location outside the spindle and proximate the chuck such that a piston of the ejector engages the workpiece;
   moving the piston from a first position outside the spindle to a second position extending within the spindle such that the workpiece travels through the spindle and is ejected therefrom.

12. The method of claim 11, further comprising:
   maintaining the piston in the first position; and
   engaging the chuck with a release mechanism such that the piston is released for movement from the first position to the second position.

13. The method of claim 11, wherein the spindle has a first end adjacent the chuck and a second end spaced from the chuck, and wherein moving the piston to the second position moves the workpiece in a direction toward the second end.

14. The method of claim 11, further comprising retracting the piston toward the first position by engaging the piston with the chuck.

15. The method of claim 11, further comprising pushing the workpiece with the piston in the first position prior to moving the piston toward the second position.

* * * * *